May 17, 1927.

J. L. BREESE, JR 1,628,644

AUTOMATIC DRAFT REGULATOR

Filed Aug. 26, 1926

Inventor
James L. Breese Jr.
by Parker & Carter
Attorneys.

Patented May 17, 1927.                                        1,628,644

UNITED STATES PATENT OFFICE.

JAMES L. BREESE, JR., OF CHICAGO, ILLINOIS, ASSIGNOR TO OIL DEVICES CORPORATION, OF CHICAGO, ILLINOIS, A CORPORATION OF ILLINOIS.

AUTOMATIC DRAFT REGULATOR.

Application filed August 26, 1926. Serial No. 131,577.

My invention relates to an automatic draft regulator and has for one purpose the provision of a draft regulator which may be quickly and simply adjusted to vary its resistance to the flow of gases or air along a pipe or flue. Another purpose is the provision of such a regulator which may be adjusted by a rotation or adjustment of the axis of its swinging valve. Other objects will appear from time to time in the course of the specification and claims.

I illustrate my invention more or less diagrammatically in the accompanying drawings, wherein.

Like parts are indicated by like symbols throughout the specification and drawings.

A indicates a flue or passage which may for example be the flue of a gas furnace, and $A^1$ is an air inlet branch therefor. Surrounding the end of said air inlet branch is the split ring B with the outwardly turned opposed terminal flanges $B^1$ through which pass any suitable securing means, for example the bolts $B^2$ with the nuts $B^3$. $B^4$ are any suitable spacers.

Secured within said split ring B is any suitable supporting ring C which preferably abuts against the outer end of the inlet member $A^1$. It may be held in position for example by the transverse pin $C^1$ passing through lugs $C^2$ in such ring, the opposite ends of the pin $C^1$ outwardly extending through the wall of the passage $A^1$ or through the split ring B which continues it, for example through the relatively extended slots $C^3$ therein. It will be understood that the member B functions as an extension of the stub pipe. $C^4$ is a limiting abutment at one side of said ring, against which abuts one edge $D^1$ of the damper plate D, pivoted to the ring for example by the pin $D^2$, the ends of which terminate within said ring. $D^3$ is a counterweight mounted upon the damper plate D, which may be situated for example at the end of the arm or bolt $D^4$.

Figure 2:
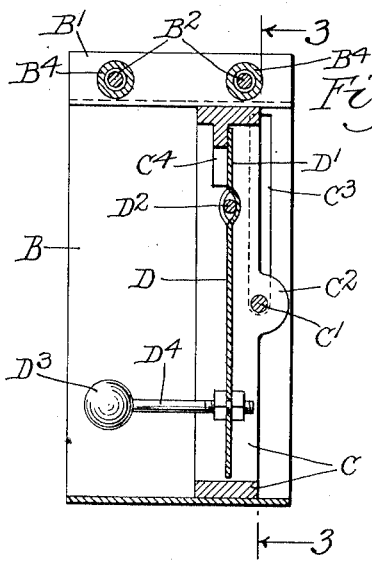
Figure 2 is a partial vertical section.
Figure 3:
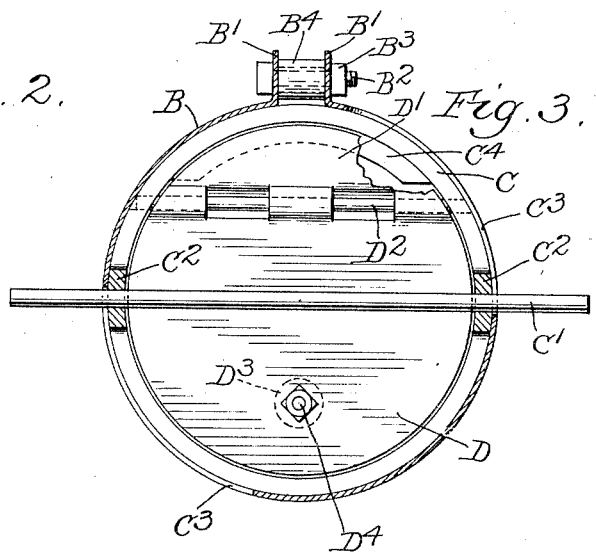
Figure 3 is a section along the line 3—3 of Figure 2.
Figure 1:
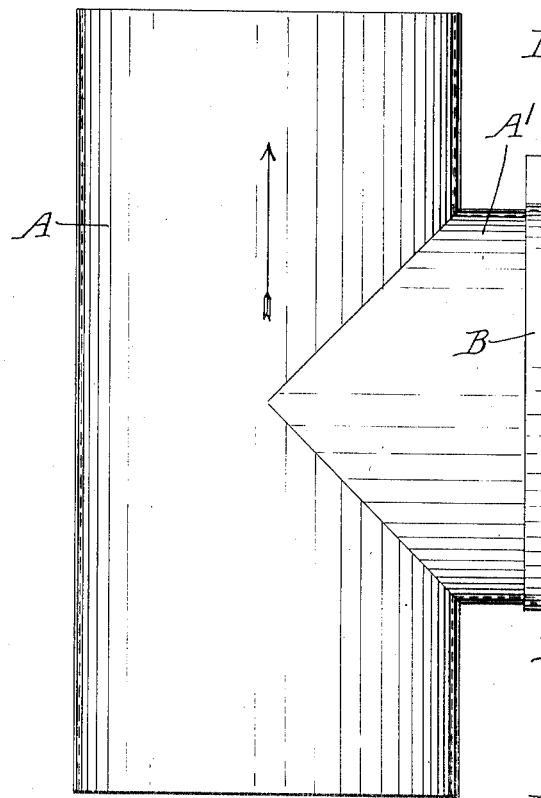
Figure 1 is a side elevation with parts indicated in outline.

It will be realized that whereas I have shown a practical and operative device nevertheless many changes might be made in the size, shape, number and disposition of parts without departing from the spirit of my invention. I therefore wish my drawings to be taken as in a broad sense illustrative and diagrammatic rather than as limiting me to my specific showing. The use and operation of my invention are as follows:

The damper plate or swinging valve D may be positioned in the flue, for example in an air inlet therefor, as herein shown, with its pivot pin $D^2$ in generally horizontal position. When so positioned the counterweight $D^3$ holds the plate D in the position shown in Figure 2, with its upper portion $D^1$ engaging the abutment $C^4$ of the ring C. The damper or swinging valve, when so positioned, will relatively strongly resist the tendency of air to displace it. When it is desired to vary the resistance of the damper or swinging valve to the passage of air or gases it is necessary merely to rotate the holding ring by moving the end or ends of the pin $C^1$. When so rotated, the axis of the valve is moved from the horizontal position, and the closing and air resisting effect of the counterweight $D^3$ is thus reduced in direct ratio to the displacement of such axis from the horizontal. Theoretically, when such axis is vertical, the counterweight has no effect whatever in resisting air passage and any desired resistance to air or gas passage may be obtained by rotation of the holding ring within such limits.

I thus provide a method of and means for regulating the amount of draft without changing the location of the damper or the amount of air used thereon or the leverage of such weight. Furthermore the adjustment is made from without, and without in any way interrupting the operation of the damper.

I prefer to calibrate the slots along which the ends of the lever $C^1$ are moved, and this calibrating provides a simple means not only for guiding the operator in draft regulation but for determining drafts. Thus for example the operator, if he moves the pin $C^1$ to the position where the swinging valve just opens, may know from the calibration substantially the draft he is dealing with.

I claim:

1. An automatic draft regulator, adapted for application to a stub pipe, including a clamping ring adapted to surround the end of said pipe, a holding ring positioned within said clamping ring, a damper plate pivoted in said holding ring and means for rotating said holding ring and damper plate.

2. An automatic draft regulator, adapted for application to a stub pipe, including a clamping ring adapted to surround the end of said pipe, a holding ring positioned within said clamping ring, a damper plate pivoted in said holding ring and means for rotating said holding ring and damper plate, including an outwardly projecting member passing through the clamping ring.

3. An automatic draft regulator, adapted for application to a stub pipe, including a clamping ring adapted to surround the end of said pipe, a holding ring positioned within said clamping ring, a damper plate pivoted in said holding ring and means for rotating said holding ring and damper plate, including an outwardly projecting member passing through the clamping ring, the ring being slotted to permit its passage, said slot being calibrated to indicate the position of the axis of the draft regulator.

4. An automatic draft regulator for application to a pipe, which includes a holding ring in rotatable relation with said pipe, a damper plate pivoted to the holding ring, and means readily operable from the exterior of the pipe for rotating said holding ring and damper plate.

5. An automatic draft regulator for application to a pipe, which includes a holding member in rotatable relation with said pipe, means for fixing said holding member against movement along the axis of the pipe, a damper plate pivoted to said holding member, and means for rotating said holding member and damper plate axis.

6. An automatic draft regulator for application to a pipe, which includes a holding member in rotatable relation with said pipe, a damper plate pivoted to the holding member, and means for rotating said holding member and damper plate, the pipe being slotted in a plane perpendicular to the axis of the pipe, to permit the passage of said rotating means.

7. An automatic draft regulator for application to a pipe, which includes a pivoted damper plate mounted in said pipe, and means for rotating the axis of said plate, including a member projecting radially and outwardly beyond said pipe.

8. An automatic draft regulator for application to a pipe, which includes a holding member in rotatable relation with said pipe, a damper plate pivoted to the holding member, and means for rotating said holding member and damper plate, and calibrating means adapted to indicate the rotation of said holding member in terms of the amount of draft.

9. An automatic draft regulator for application to a pipe, which includes a holding member in rotatable relation with said pipe, a damper plate pivoted to the holding member, and means for rotating said holding member and the axis of the damper plate, and a counter weight on said damper plate, positioned below its normal axis of rotation.

10. An automatic draft regulator for application to a pipe, which includes a fixed holding member adapted to be secured against normal movement in relation to said pipe, a rotatable supporting member freely rotatable in relation to said fixed holding member and pipe, a damper plate pivoted to the supporting member, and means for rotating said supporting member and the axis of the damper plate.

11. An automatic draft regulator for application to a pipe, which includes a fixed holding member adapted to be secured against normal movement in relation to said pipe, a rotatable supporting member freely rotatable in relation to said fixed holding member and pipe, a damper plate pivoted to the supporting member, and means for rotating said supporting member and the axis of the damper plate, and a counterweight on said damper plate positioned below its normal axis of rotation.

12. An automatic draft regulator for application to a pipe, which includes a fixed holding member adapted to be secured against normal movement in relation to said pipe, a rotatable supporting member freely rotatable in relation to said fixed holding member and pipe, a damper plate pivoted to the supporting member, and means for rotating said supporting member and the axis of the damper plate, and a counterweight on said damper plate positioned below its normal axis of rotation, said counterweight including a support extending from the damper plate and a weight mounted on said support.

13. An automatic draft regulator for application to a pipe, which includes a holding member in rotatable relation with said pipe, a damper plate pivoted to the holding member, and means for rotating said holding member and the axis of the damper plate, and a counterweight on said damper plate, positioned below its normal axis of rotation, said counterweight including a support extending from the damper plate and a weight mounted on said support.

14. An automatic draft regulator, adapted for application to a stub pipe, including a clamping ring adapted to surround the end of said pipe, a holding ring positioned within said clamping ring, a damper plate pivoted in said holding ring and means for rotating said holding ring and damper plate, and a counterweight on said damper plate, positioned below its normal axis of rotation, and consisting of a support extending from said plate and a weight positioned on said support.

Signed at Chicago county of Cook and State of Illinois, this 23rd day of August 1926.

JAMES L. BREESE, Jr.